(12) United States Patent
Dingli et al.

(10) Patent No.: US 11,926,317 B2
(45) Date of Patent: Mar. 12, 2024

(54) MANAGING LANE CHANGE THREATS

(71) Applicant: PlusAI, Inc., Santa Clara, CA (US)

(72) Inventors: Robert Joseph Dingli, Cupertino, CA (US); Lichun Yang, Cupertino, CA (US); Mohammadhussein Rafieisakhaei, Foster City, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/299,450

(22) Filed: Apr. 12, 2023

(65) Prior Publication Data
US 2024/0034312 A1 Feb. 1, 2024

Related U.S. Application Data

(63) Continuation of application No. 17/877,764, filed on Jul. 29, 2022, now Pat. No. 11,654,902.

(51) Int. Cl.
*B60W 30/18* (2012.01)
*B60W 30/09* (2012.01)
(Continued)

(52) U.S. Cl.
CPC ........ *B60W 30/09* (2013.01); *B60W 30/0956* (2013.01); *B60W 30/18163* (2013.01);
(Continued)

(58) Field of Classification Search
CPC ............ B60W 30/09; B60W 30/0956; B60W 30/18163; B60W 40/04; B60W 40/12;
(Continued)

(56) References Cited

U.S. PATENT DOCUMENTS

| 10,259,459 | B2* | 4/2019 | Takae | G08G 1/167 |
| 11,654,902 | B1* | 5/2023 | Dingli | B60W 60/0015 |
| | | | | 701/93 |

(Continued)

FOREIGN PATENT DOCUMENTS

DE 102017216800 A1 * 3/2019

OTHER PUBLICATIONS

U.S. Appl. No. 17/877,764, "Non-Final Office Action", dated Nov. 22, 2022, 24 pages.
(Continued)

*Primary Examiner* — Donald J Wallace
*Assistant Examiner* — Daniel M. Robert
(74) *Attorney, Agent, or Firm* — Kilpatrick Townsend & Stockton LLP

(57) ABSTRACT

Embodiments provide a vehicle computer coupled to a vehicle. The vehicle computer may be configured to compute (e.g., generate) an automated lane change maneuver moving the vehicle from a first lane into a second, adjacent lane. The lane change maneuver may have commenced while the maneuver was safe to conduct, but a threat vehicle (or another threat object) may be subsequently detected moving into the same target lane. The option to immediately abort the maneuver and return to the original lane may not be appropriate after some time into the lane change maneuver. The vehicle computer may control the vehicle in a lateral position hold along the lane demarcation line for a predetermined amount of time before moving into the second lane when the threat vehicle clears the second lane or returning to the first lane when the threat vehicle does not clear the second lane.

20 Claims, 10 Drawing Sheets

(51) Int. Cl.
  *B60W 30/095* (2012.01)
  *B60W 40/04* (2006.01)
  *B60W 40/12* (2012.01)
  *B60W 60/00* (2020.01)

(52) U.S. Cl.
  CPC ............ *B60W 40/04* (2013.01); *B60W 40/12* (2013.01); *B60W 60/0015* (2020.02); *B60W 2300/12* (2013.01); *B60W 2530/201* (2020.02); *B60W 2554/40* (2020.02)

(58) Field of Classification Search
  CPC ......... B60W 60/0015; B60W 2300/12; B60W 2530/201; B60W 2554/40
  See application file for complete search history.

(56) References Cited

U.S. PATENT DOCUMENTS

| | | | |
|---|---|---|---|
| 2010/0228419 A1* | 9/2010 | Lee | B62D 15/0255 701/25 |
| 2015/0151725 A1 | 6/2015 | Clarke et al. | |
| 2016/0091896 A1* | 3/2016 | Maruyama | B60W 30/18163 701/23 |
| 2017/0123430 A1* | 5/2017 | Nath | G05D 1/021 |
| 2017/0174269 A1 | 6/2017 | Farhadi et al. | |
| 2018/0345978 A1* | 12/2018 | Fujii | B60W 30/18163 |
| 2019/0084572 A1 | 3/2019 | Oishi et al. | |
| 2019/0143983 A1* | 5/2019 | Hashimoto | B60W 10/20 701/23 |
| 2019/0152525 A1* | 5/2019 | Resch | G01C 21/34 |
| 2019/0367022 A1* | 12/2019 | Zhao | B60W 30/18154 |
| 2020/0298848 A1* | 9/2020 | Yanagihara | B60W 40/04 |

OTHER PUBLICATIONS

U.S. Appl. No. 17/877,764 , "Notice of Allowance", dated Jan. 26, 2023, 12 pages.

* cited by examiner

MANAGING LANE CHANGE THREATS

CROSS-REFERENCES TO RELATED APPLICATIONS

This application is a continuation application of U.S. application Ser. No. 17/877,764 filed Jul. 29, 2022 and entitled "Managing Lane Change Threats", the disclosure of which is incorporated by reference herein in its entirety for all purposes.

BACKGROUND

Various vehicles employ computing means to aid automated vehicle operation. Recently, in the automotive industry, much of the focus is on making a vehicle operate in an autonomous mode in a safe manner.

For an autonomous vehicle (AV) that supports an auto lane change procedure, there are some particularly difficult scenarios to manage. One such scenario is when the host or "ego" vehicle has started a lane change maneuver into a clear target lane but then another object (e.g., a threat vehicle) proceeds to enter the same lane (e.g. from two lanes over) after the lane change maneuver has started. The AV system has the option to abort the lane change and return to the original lane, however, at some point during the lane change maneuver, it is considered more appropriate to continue with the maneuver rather than abort it. Returning to the original lane late in the auto lane change maneuver could result in unstable vehicle motion and/or confuse the surrounding traffic.

Embodiments are directed to addressing these and other problems, individually and collectively.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Embodiments provide a vehicle computer coupled to a vehicle. The vehicle computer may be configured to perform an automated lane change maneuver moving the vehicle from a first lane into a second, adjacent lane. A threat vehicle (or another threat object) may be detected moving into the same target lane. The option to immediately abort the maneuver and return to the original lane may not be appropriate after some time into the lane change maneuver. Embodiments control the vehicle in a lateral position hold along the lane demarcation line for a predetermined amount of time before moving into the second lane when the threat vehicle clears the second lane or returning to the first lane when the threat vehicle does not clear the second lane.

In one general aspect, a method may include receiving, by a vehicle computer of a vehicle, a command to perform a lane change maneuver from a first lane where the vehicle is traveling into a second lane adjacent to the first lane. Method may also include initiating, by the vehicle computer, the lane change maneuver. Method may furthermore include detecting, by the vehicle computer after initiating the lane change maneuver, a collision risk with a mobile object moving on the second lane. Method may in addition include determining, by the vehicle computer, a real-time position of the vehicle with respect to the first lane or the second lane in response to the collision risk. Method may moreover include determining, by the vehicle computer, that the vehicle is in one of a plurality of predetermined stages associated with the lane change maneuver based on the real-time position of the vehicle. Method may also include performing, by the vehicle computer, a preventive maneuver responsive to the detected mobile object based on determined stage associated with the lane change maneuver, where the preventive maneuver includes instructions sent to actuators of the vehicle to control the vehicle to one or more of move back to the first lane, proceed along a lateral path between the first lane and the second lane, or move to the second lane.

In one general aspect, a vehicle computer may include one or more processors and a memory storing instructions that, when executed by the one or more processors, cause the one or more processors to: receive a command to perform a lane change maneuver from a first lane where the vehicle is traveling into a second lane adjacent to the first lane; initiate the lane change maneuver; detect, after initiating the lane change maneuver, a collision risk with a mobile object moving on the second lane; determine a real-time position of the vehicle with respect to the first lane or the second lane in response to the collision risk; determine that the vehicle is in one of a plurality of predetermined stages associated with the lane change maneuver based on the real-time position of the vehicle; and perform a preventive maneuver responsive to the detected mobile object based on determined stage associated with the lane change maneuver, where the preventive maneuver includes instructions sent to actuators of the vehicle to control the vehicle to one or more of move back to the first lane, proceed along a lateral path between the first lane and the second lane, or move to the second lane.

In one general aspect, a non-transitory computer-readable medium storing instructions that, when executed by one or more processors of a vehicle computer of a vehicle, cause the vehicle computer to receive a command to perform a lane change maneuver from a first lane where the vehicle is traveling into a second lane adjacent to the first lane. The non-transitory computer-readable medium may further store instructions that, when executed by the one or more processors of the vehicle computer of the vehicle, cause the vehicle computer to initiate the lane change maneuver; and, after initiating the lane change maneuver, determining a collision risk with a mobile object moving on the second lane. The non-transitory computer-readable medium may further store instructions that, when executed by the one or more processors of the vehicle computer of the vehicle, cause the vehicle computer to determine a real-time position of the vehicle with respect to the first lane or the second lane in response to the collision risk. The non-transitory computer-readable medium may further store instructions that, when executed by the one or more processors of the vehicle computer of the vehicle, cause the vehicle computer to determine that the vehicle is in one of a plurality of predetermined stages associated with the lane change maneuver based on the real-time position of the vehicle. The non-transitory computer-readable medium may further store instructions that, when executed by the one or more processors of the vehicle computer of the vehicle, cause the vehicle computer to perform a preventive maneuver responsive to the detected mobile object based on determined stage associated with the lane change maneuver, where the preventive maneuver includes instructions sent to actuators of the vehicle to control the vehicle to one or more of move back to the first lane, proceed along a lateral path between the first lane and the second lane, or move to the second lane.

Other embodiments of this aspect include corresponding computer systems, apparatus, and computer programs recorded on one or more computer storage devices, each configured to perform the actions of the methods.

Further details regarding embodiments of can be found in the Detailed Description and the Figures.

DETAILED DESCRIPTION

Figure 1A:
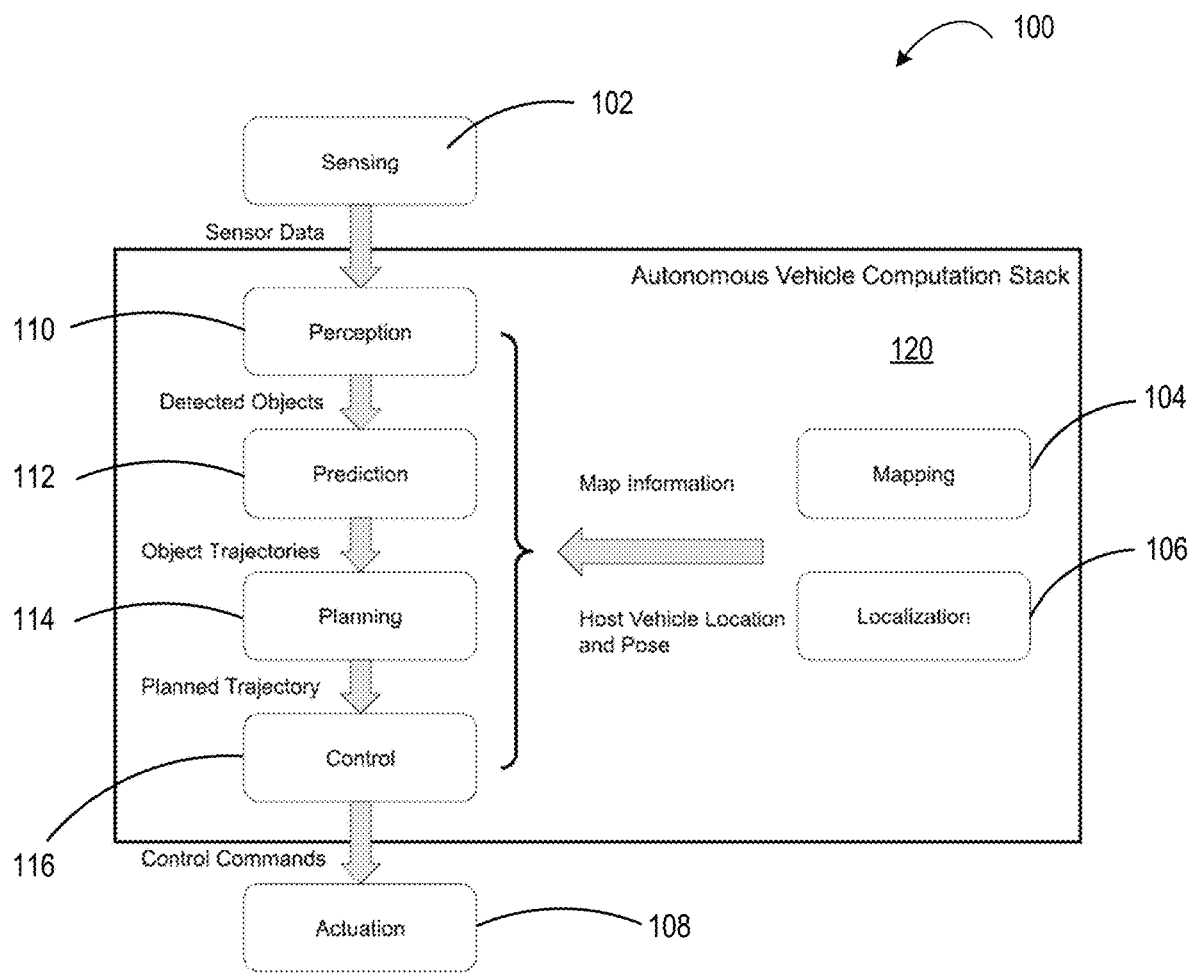
FIG. 1A illustrates components of an exemplary vehicle computer for an autonomous vehicle, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments provide a vehicle computer coupled to a vehicle. The vehicle computer may be configured to perform an automated lane change maneuver moving the vehicle from a first lane into a second, adjacent lane. In some embodiments, the vehicle may be an autonomous vehicle. In some embodiments, the auto lane change maneuver may have commenced while the maneuver was safe to conduct, but a threat vehicle (or another threat object) may be subsequently detected moving into the same target lane. The option to immediately abort the maneuver and return to the original lane may not be appropriate after some time into the lane change maneuver. This is particularly relevant for large trucks, where jerky lateral motion could lead to vehicle instability or confusion of surrounding traffic. While the human driver (where available) may take over manual control of the vehicle to manage the situation, in the event of the human driver being unable to act or the vehicle being allowed to oversee the maneuver, embodiments control the vehicle in a lateral position hold along the lane demarcation line for a predetermined amount of time before moving into the second lane when the threat vehicle clears the second lane or returning to the first lane when the threat vehicle does not clear the second lane.

Prior to discussing embodiments, some terms can be described in further detail.

As used herein, a "maneuver" may refer to a sequence of desired system state (position, pose, speed etc.) in future time. A control module of a vehicle computer may receive the maneuver and generate instantaneous commands or a vector of commands as a function of time. The commands may include steering commands and acceleration/deceleration commands among others.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

Embodiments provide a vehicle computer coupled to a vehicle (e.g., a car, a bus, a truck with one or more trailers coupled thereto, or a semitruck). Embodiments provide a vehicle computer coupled to a vehicle (e.g., a car, a bus, a truck with one or more trailers coupled thereto, or a semitruck). FIG. 1A provides a block diagram of an exemplary vehicle computer 100, according to various embodiments. The vehicle computer 100 may include a main computation stack 120 (e.g., a vehicle computer) including one or more processors. The main computation stack 120 may comprise one or more modules, including but not limited to, a perception module 110, a prediction module 112, a planning/planner module 114, and a control module 116.

The main computation stack 120 may receive inputs (e.g., sensor data) from one or more input devices 102. According to various embodiments, the input devices 102 may include one or more of a radar sensor, a light detection and ranging (lidar) sensor, a camera, computer vision, a Global Positioning System (GPS) sensor, etc. The sensor data may be provided to the perception module 110 that may identify one or more objects in the input data. The input data and the identified objects may then be provided to the prediction module 112 that may predict trajectories of the identified objects, so that the planner module 114 may determine one or more trajectories for the vehicle that would avoid the stationary or moving objects based on the input data from the prediction module 112. The one or more trajectories planned by the panning module 114 may be provided to the control module 116, which would then control one or more actuators 108 of the vehicle to have the vehicle advance in accordance with at least one of the one or more trajectories.

According to various embodiments, one or more of the perception module 110, the prediction module 112, the planning module 114 and/or the control module 116 may also receive mapping data 104 and/or localization data 106 for improved trajectory generation. The modules may calculate their respective outputs based on the mapping data 104 and/or localization data 106, in addition to the inputs received from the input devices 102.

Figure 1B:
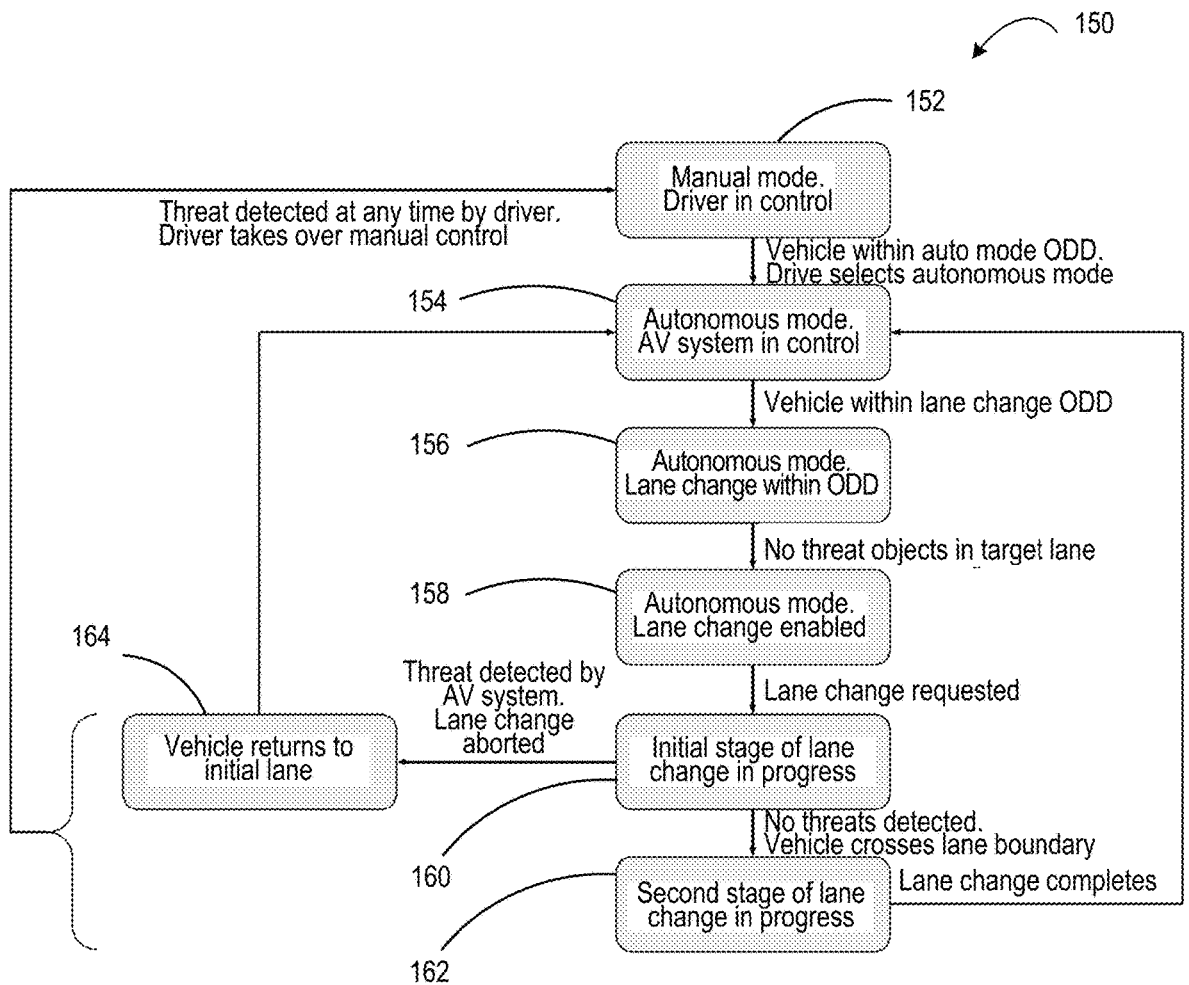
FIG. 1B provides a flowchart of a vehicle computer performing an automated lane change maneuver.

FIG. 1B provides a flowchart 150 of a vehicle computer performing an automated lane change maneuver. The vehicle computer described in the flowchart 150 has the ability to detect a threat vehicle after starting the lane change maneuver, but the vehicle computer is configured to only take action if the auto lane change procedure is in the early stage of the maneuver. If a threat object is detected before crossing the lane boundary, the vehicle computer will abort the lane change maneuver, and the ego vehicle will return to the original lane. However, if the threat object is detected after crossing the lane boundary, the vehicle computer will continue with the lane change maneuver, and the ego vehicle will complete the lane change. The driver may have the ability to take over manual driving control at any time.

At step 152, the vehicle may be in a manual mode where the driver is in control. The driver may wish to leave the control of the vehicle to the vehicle computer. The vehicle may move into the operation design domain (ODD) region within which the vehicle is enabled to operate is the autonomous mode. At step 154, the vehicle may be in the autonomous mode where the vehicle computer (e.g., Autonomous Vehicle (AV) System) is in control.

At step 156, the vehicle computer may be still in the autonomous mode, and may confirm that the lane change command is received and is within the operation design domain (ODD). At step 158, while still in the autonomous mode, the vehicle computer may confirm that there are no threats detected in the target lane (e.g., the second lane) and (if applicable) that the driver has their hands on the steering wheel. The vehicle computer may enable the lane change maneuver to move from the first lane into the target (e.g., second) lane. According to various embodiments, the lane change maneuver may be requested by the driver.

At step 160, the vehicle may be in the initial stage of the lane change maneuver. For example, the vehicle computer may control the vehicle to move closer to the lane demarcation line, getting ready to move into the second lane. The vehicle computer may check for any new threats along the trajectory of the lane change maneuver. For example, the vehicle computer may verify the data provided by various sensors of the vehicle to identify whether there is a threat along the trajectory.

If no threats are detected, at step 162, the vehicle computer continues with the lane change maneuver and progresses into the second stage of the lane change maneuver during which the vehicle quits the first lane and travels into the second lane. The vehicle computer successfully completes the lane change maneuver and continues to control the vehicle in the autonomous mode, similar to step 154.

If, on the other hand, the vehicle computer detects a threat during the initial stage of the lane change maneuver (during step 160), the vehicle computer aborts the lane change maneuver, and controls the vehicle to return to the initial position in the first lane at step 164. Once the initial position in the first lane is resumed, the vehicle computer continues to control the vehicle in the autonomous mode, similar to step 154. Alternatively, when the vehicle computer detects a threat during the initial stage of the lane change maneuver (during step 160), the vehicle computer may warn the driver to take control of the vehicle, or the driver may simply assume control of the vehicle to respond to the detected threat.

As described above in connection with FIG. 1B, the vehicle computer described in the flowchart 150 has the ability to detect a threat vehicle after starting the lane change maneuver, but the vehicle computer is configured to only take action if the auto lane change procedure is in the early stage of the maneuver. However, the vehicle computer may detect a threat in the later stages of the lane change maneuver. While the existing systems request the driver the take over, embodiments provide alternative control techniques where the vehicle computer can avoid the threat.

After initially crossing the lane boundary (e.g., the lane demarcation line) between the first lane where the vehicle is traveling and the second lane (e.g., the target lane), the vehicle computer may detect a potential collision risk with a mobile object (e.g., a threat vehicle) having started to move into the target lane. For example, a vehicle that is two lanes over the first lane where the ego vehicle is traveling may change lanes during the lane change maneuver of the ego vehicle. If the mobile object (e.g., the threat vehicle) is detected prior to the ego vehicle moving out of the first lane, the vehicle computer can abort the maneuver, as discussed in connection with FIG. 1B. However, when the ego vehicle is a truck, it may be difficult to change directions quickly so there comes a point after which the vehicle computer of a truck may not abort the lane change maneuver simply because that jerky motion can itself be destabilizing and become a hazard.

According to various embodiments described herein, a vehicle computer may be configured to control the vehicle traveling along a first lane. The vehicle computer may receive a command to move from the first lane into the second lane. The command may be received from a human driver, a remote driver or a control module of the vehicle computer. For example, the planner module 114 of the vehicle computer may determine a trajectory including a lane change maneuver. One or more modules of the vehicle computer may process the lane change maneuver in a plurality of predetermined stages including, for example, a first stage during which a predetermined portion of the vehicle is in the first lane, a second stage during which the vehicle is partially in the first lane and partially in the second lane, and a third stage during which the predetermined portion of the vehicle is in the second lane. In some embodiments, the predetermined portion of the vehicle may be determined based on a relative position of a center line of the vehicle with respect to a center line of the first lane. The vehicle compute is configured to react to (e.g., generate and implement a preventive maneuver in response to) a moving object (e.g., a threat vehicle) detected at the first or the second stages of the lane change maneuver. That is, the vehicle is also configured to react to a threat detected at a later stage of the lane change maneuver.

In some embodiments, the vehicle computer may predict that a threat vehicle may enter the target lane which could then pose a potential collision risk. The potential collision risk can be determined by estimating the future trajectory of the surrounding mobile objects, given the previous trajectory and behavior, and the planned trajectory and geometry of the ego vehicle including the independent motion of the trailer relative to the tractor (e.g., in the case of a truck). Once detected, the vehicle computer ceases the lateral movement of the ego vehicle from the first lane into the second lane, and adjusts the current heading of the vehicle in the direction of the lanes. This stage in the lane change maneuver may be referred to as 'lateral position hold'. The lateral position hold may be along the lane demarcation line where a portion of the vehicle is in the first lane and a portion of the vehicle is in the second lane. The vehicle computer may keep the ego vehicle in the lateral position hold for a predetermined amount of time.

If the threat vehicle responds to the encounter and moves back into its original lane or accelerates and drives past the ego vehicle within the predetermined amount of time (or if the vehicle computer predicts that the threat vehicle has, or is about to, react to the presence of the ego vehicle within the predetermined amount of time), clearing the path for the ego vehicle to complete the lane change maneuver, then the vehicle computer of the ego vehicle may proceed with the lane change maneuver and move the ego vehicle into the target lane (e.g., the second lane).

If, on the other hand, the threat vehicle continues to move into the target lane continuing to pose a potential collision risk by the end of the predetermined amount of time, the vehicle computer may abort the lane change maneuver and move the ego vehicle back to the first (e.g., its original) lane. The lateral movement of the ego vehicle during the lateral position hold should not be far enough out of the original lane as to allow other vehicle(s) to enter the original lane and restrict the option to return to the original lane.

In embodiments where the vehicle computer determines to abort the lane change maneuver, but the original lane is not clear anymore (e.g., aborting the lane change to the original lane is not deemed safe by the vehicle computer), the vehicle computer may control the ego vehicle to continue to move in the lateral position hold (e.g., along the direction of the lane demarcation line) until either of the first lane or the second lane clears out, or a timeout of the operation causes an alert to the driver to take over and manually drive the ego vehicle. A time threshold may be used to determine when this decision to return to the original lane is made. For example, the time threshold may be about five seconds. That is, if either lane is not freed up after five seconds, the vehicle computer may ask the driver to assume control of the ego vehicle.

Figure 2:
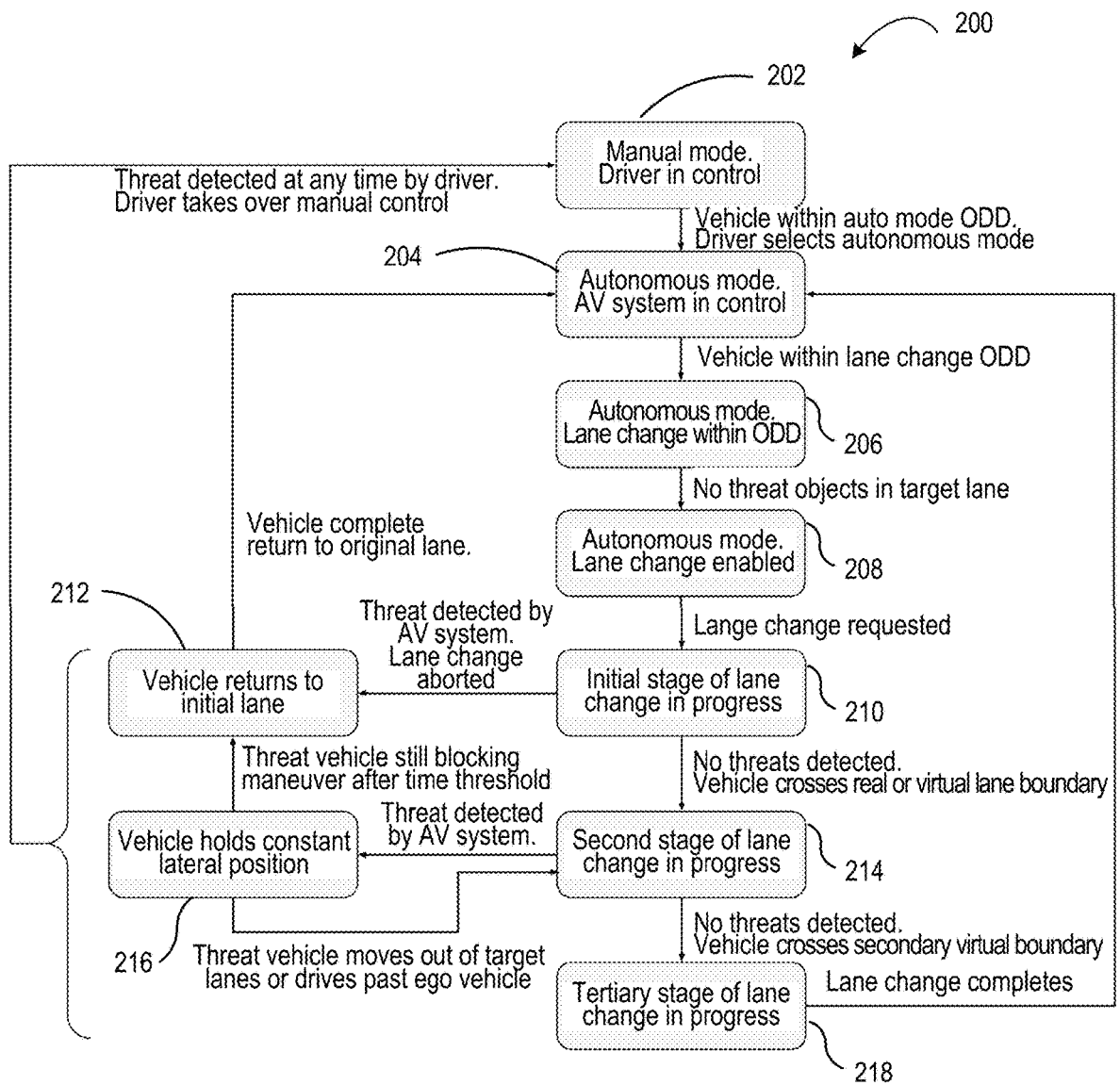
FIG. 2 provides a flowchart of a vehicle computer performing an automated lane change maneuver in multiple stages, according to various embodiments.

FIG. 2 provides a flowchart 200 of a vehicle computer performing an automated lane change maneuver in multiple stages, according to various embodiments. For example, the plurality of predetermined stages associated with the lane change maneuver includes a first stage during which a predetermined portion of the vehicle is in the first lane, a second stage during which the vehicle is partially in the first lane and partially in the second lane, and a third stage during which the predetermined portion of the vehicle is in the second lane. The vehicle computer described in the flowchart 200 has the ability to detect a threat vehicle after starting the lane change maneuver, and the vehicle computer is configured to take action if the auto lane change procedure is in the early stage (e.g., first stage) as well as intermediary/late stage (e.g., the second stage) of the maneuver. If a threat object is detected before crossing the lane boundary, the ego vehicle will return to the original lane. If a threat object is detected after initiating a cross over the lane boundary, the ego vehicle may keep a lateral position hold. After a predetermined amount of time on the lateral position hold, the vehicle computer may control the ego vehicle to move to the second lane or return to the original lane. The driver may have the ability to take over manual driving control at any time.

At step 202, the vehicle may be in a manual mode where the driver is in control. The driver may wish to leave the control of the vehicle to the vehicle computer. The vehicle may move into the operation design domain (ODD) region within which the vehicle is enabled to operate is the autonomous mode. At step 204, the vehicle may be in the autonomous mode where the vehicle computer is in control. The vehicle computer may receive a command to perform a lane change maneuver from a first lane where the vehicle is traveling into a second lane adjacent to the first lane. The lane change maneuver command may be received from a driver of the vehicle or may be generated by a control module of the vehicle computer. According to various embodiments, the vehicle may be a fully autonomous vehicle with or without a driver being in the vehicle. In such embodiments, the flowchart may start at step 204.

At step 206, the vehicle computer may be still in the autonomous mode, and may confirm that the lane change command is received and is within the operation design domain (ODD). The vehicle computer may initiate the lane change maneuver.

At step 208, while still in the autonomous mode, the vehicle computer may confirm that there are no threats detected in the target lane (e.g., the second lane) and (if applicable) that the driver has their hands on the steering wheel. The vehicle computer may enable the lane change maneuver to move from the first lane into the target (e.g., second) lane.

At step 210, the vehicle may be in the initial stage (e.g., first stage) of the lane change maneuver. For example, the vehicle computer may control the vehicle to move closer to the lane demarcation line, getting ready to move into the second lane. The vehicle computer may check for any new threats along the trajectory of the lane change maneuver. For example, the vehicle computer may verify the data provided by various sensors of the vehicle to identify whether there is a threat along the trajectory.

If the vehicle computer detects a threat during the initial stage of the lane change maneuver (during step 210), the vehicle computer aborts the lane change maneuver, and controls the vehicle to return to the initial position in the first lane at step 212. Once the initial position in the first lane is resumed, the vehicle computer continues to control the vehicle in the autonomous mode, similar to step 204. Alternatively, when the vehicle computer detects a threat during the initial stage of the lane change maneuver (during step 210), the vehicle computer may warn the driver to take control of the vehicle, or the driver may simply assume control of the vehicle to respond to the detected threat.

In some embodiments, the stage of the lane change maneuver may be determined based on a real-time position of the ego vehicle. For example, the vehicle computer may determine if a first predetermined threshold in the lane change maneuver has been reached and/or passed. In some embodiments, the first predetermined threshold may be the relative position of a center line of the vehicle with respect to a center line of the first lane. For example, if a center line of the vehicle has not yet moved past a predetermined amount of distance (e.g., 0.7 meters) from the center line of the first lane, the vehicle may be determined to be in the first stage of the lane change maneuver. The lane change maneuver may be safely aborted during the first stage in response to a detected threat.

If, on the other hand, no threats are detected, at step 214, the vehicle computer continues with the lane change maneuver and progresses into the second stage of the lane change maneuver during which the vehicle crosses over a real or virtual lane demarcation line between the first lane and the second lane. The vehicle computer controls the vehicle to move over the real or virtual lane demarcation line between the first lane and the second lane. During the second stage of the lane change maneuver, the vehicle is not sufficiently far across into the second lane that it is blocking the second lane. The portion of the vehicle in the first (initial) lane is such that the vehicle is restricting other objects from hopping into the first lane. During the lateral position hold, the vehicle blocks the first lane to such degree that would allow the vehicle to move back into the first lane if needed. During the second stage of the lane change maneuver, the vehicle computer continues to check for threats.

If the vehicle computer identifies a collision risk with a mobile object moving on the second lane during step 214, the vehicle computer may control the vehicle to assume a lateral position hold trajectory where the vehicle computer controls the vehicle to proceed along the lateral path between the first lane and the second lane (e.g., along the real or virtual lane demarcation line). The lateral position hold may be a preventive maneuver implemented by the vehicle computer responsive to the detected collision risk with the mobile object.

According to some embodiments, the vehicle computer may control the vehicle to continue the lateral position hold trajectory for a predetermined amount of time. The predetermined amount of time may be the second predetermined threshold that determines the length of the second stage of the lane change maneuver. If by the end of the predetermined amount of time (e.g., the second predetermined threshold), the vehicle computer determines that the second lane is now clear (e.g., the threat vehicle moved out of the target lane, or drove past the ego vehicle, or aborted its maneuver), the vehicle computer may continue with the lane change maneuver at step 218.

At step 218, the vehicle computer may move onto the third stage of the lane change maneuver during which the vehicle computer may control the ego vehicle to completely quit the first lane and travel into the second lane. The vehicle computer successfully completes the lane change maneuver and continues to control the vehicle in the autonomous mode, similar to step 204.

If, on the other hand, by the end of the predetermined amount of time, the vehicle computer still identifies the potential collision risk with the mobile object (e.g., the threat vehicle continues with its trajectory and blocks the second lane), the vehicle computer may abort the lane change maneuver, and control the vehicle to return to the initial position in the first lane similar to step 212. Once the initial position in the first lane is resumed, the vehicle computer continues to control the vehicle in the autonomous mode, similar to step 204. Alternatively, when the vehicle computer detects a threat during the second stage of the lane change maneuver (during step 214), the vehicle computer may control the vehicle to hold constant lateral position, and warn the driver to take control of the vehicle, or the driver may simply assume control of the vehicle to respond to the detected threat.

As described above in connection with FIG. 2, the vehicle computer described in the flowchart 200 has the ability to detect a threat vehicle after starting the lane change maneuver, and respond to the detected threat even when the lane change procedure is in the late stage of the maneuver (e.g., after at least a portion of the vehicle moved out of the first lane, while a portion of the vehicle is in the first lane and remainder of the vehicle is in the second lane).

According to various embodiments, the movement of the ego vehicle may be divided into a plurality of phases during the lane change maneuver to have less jerky and predictable vehicle motion. For example, the plurality of phases may include a) an initial lateral movement into the target lane, b) a straight movement aligned with the lane direction, and c) a lateral movement back to the original lane. FIGS. 3-7 illustrate various lane change maneuver scenarios that may be implemented using techniques disclosed herein. In FIGS. 3-7, T1, T2, T3 and T4 represent consecutive time intervals. While FIGS. 3-7 illustrate a lane change maneuver attempt from a right lane into a left lane for the ego vehicle 302, one of ordinary skill in the art will appreciate that similar techniques are applicable to a lane change maneuver attempt from a left lane into a right lane for the ego vehicle 302. According to various embodiments, the ego vehicle 302 may be over 45 feet long (e.g. the ego vehicle 302 may be a truck).

Figure 3:
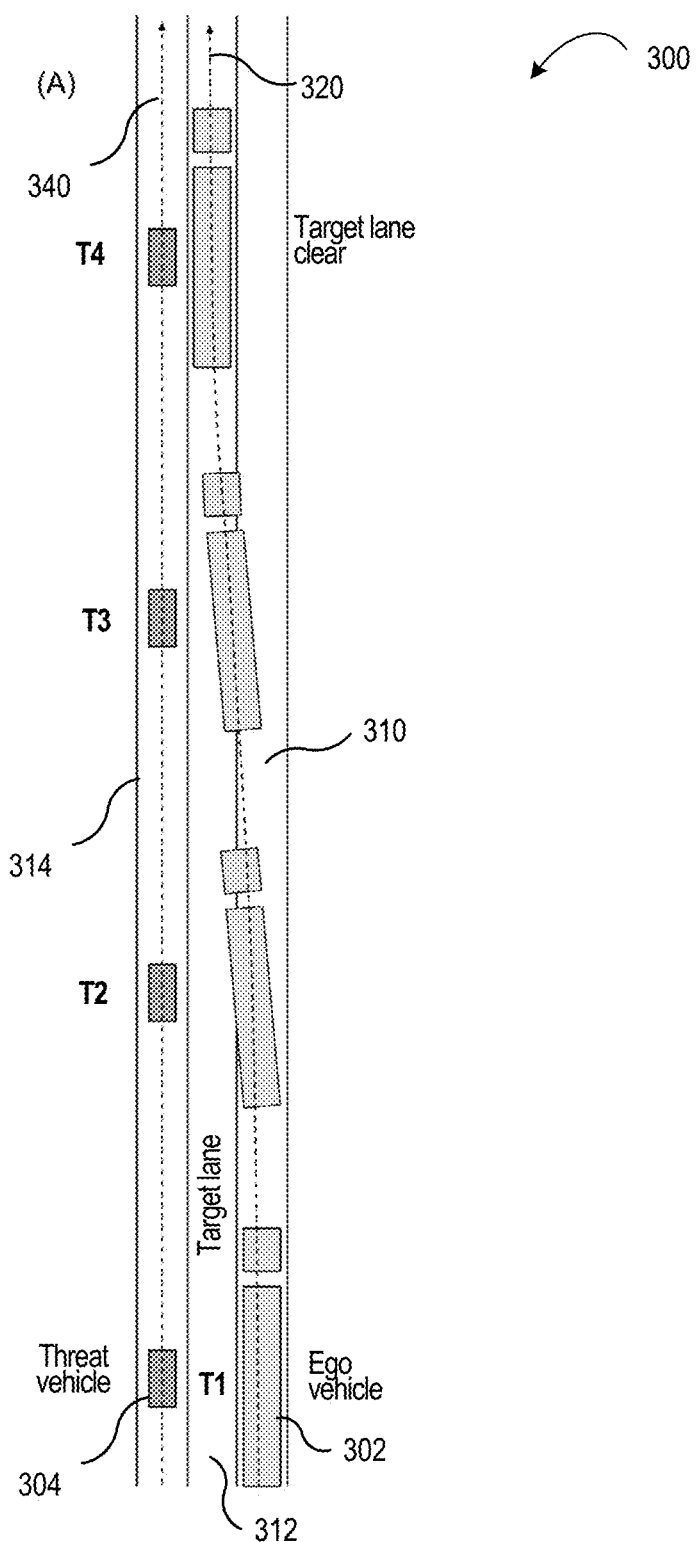
FIG. 3 illustrates a lane change maneuver that is completed without detecting a collision risk after initiating the maneuver, according to various embodiments.

FIG. 3 illustrates a lane change maneuver 300 that is completed without detecting a collision risk after initiating the maneuver, according to various embodiments. The scenario illustrated in FIG. 3 demonstrates a regular auto lane change maneuver where the secondary vehicle poses no threat to the ego vehicle.

As illustrated in FIG. 3, at time interval T1, the ego vehicle 302 is traveling on the first lane 310 and the second vehicle (e.g. the threat vehicle) 304 is traveling on the third lane 314. The vehicle computer of the ego vehicle 302 may control the ego vehicle 302 to perform a lane change maneuver from the first lane 310 into the second lane 312 (e.g., the target lane). At time interval T2, the vehicle computer may initiate the lane change maneuver. The vehicle computer of the ego vehicle 302 may continue to monitor surrounding objects, including the second vehicle 304, while performing the lane change maneuver. The vehicle computer may continue with the lane change maneuver at time interval T3 in response to determining that the second lane 312 is clear and failing to identify new threats during the lane change maneuver. At time interval T4, the vehicle computer may complete the lane change maneuver and control the ego vehicle 302 to move from the first lane 310 into the second lane 312.

In the scenario illustrated in FIG. 3, the second vehicle 304 may continue its trajectory along the third lane 314 thereby not posing a threat to the ego vehicle 302. FIG. 3 illustrates the ego vehicle 302 following a first trajectory 320 that moves the ego vehicle from the first lane 310 into the second lane 312, while the second vehicle 304 follows a second trajectory 340 along the third lane 314.

Figure 4:
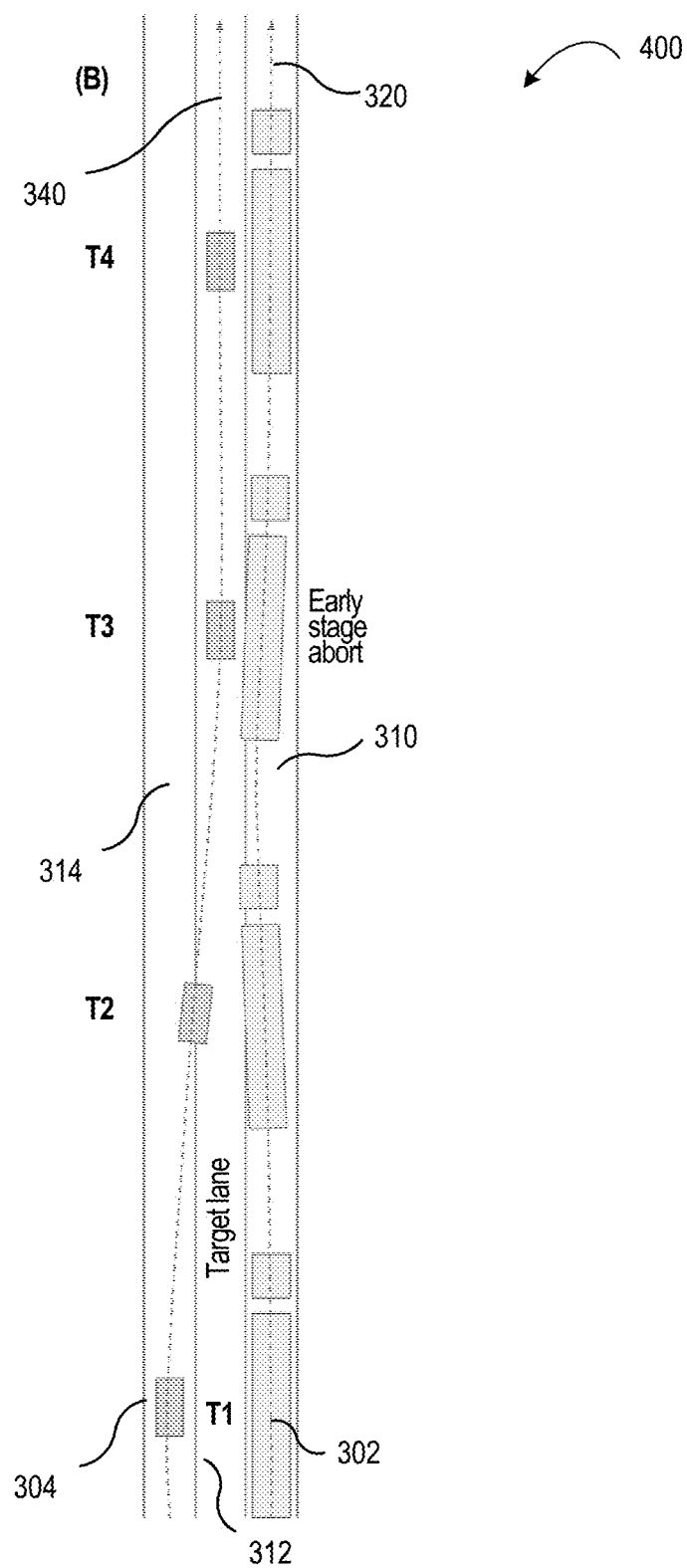
FIG. 4 illustrates a lane change maneuver that is aborted in response to a collision risk detected during an initial stage of the maneuver, according to various embodiments.

FIG. 4 illustrates a lane change maneuver 400 that is aborted in response to a collision risk detected during an initial stage (e.g., first stage) of the maneuver, according to various embodiments. The scenario illustrated in FIG. 4 demonstrates an early stage lane change abort where the ego vehicle returns to the original lane having only moved a small distance laterally before recognizing the secondary vehicle as a threat.

As illustrated in FIG. 4, at time interval T1, the ego vehicle 302 is traveling on the first lane 310 and the second vehicle (e.g. the threat vehicle) 304 is traveling on the third lane 314. The vehicle computer of the ego vehicle 302 may control the ego vehicle 302 to perform a lane change maneuver from the first lane 310 into the second lane 312 (e.g., the target lane). At time interval T2, the vehicle computer may initiate the lane change maneuver. The vehicle computer of the ego vehicle 302 may continue to monitor surrounding objects, including the second vehicle 304, while performing the lane change maneuver. The vehicle computer may determine that the second vehicle 304 initiated a lane change maneuver from the third lane 314 into the second lane 312 and that the second vehicle 304 now blocks the target lane (the second lane 312) for the ego vehicle 302. That is, the vehicle computer may detect a collision risk with a mobile object (the second vehicle 304) moving on the second lane after initiating the lane change maneuver.

After detecting the collision risk, the vehicle computer may determine how far along into the lane change maneuver has the ego vehicle 302 traveled. According to the scenario illustrated in FIG. 4, the vehicle computer may determine that the ego vehicle 302 is in the initial/early stage of the lane change maneuver. For example, the vehicle computer may determine a real-time position of the ego vehicle 302 with respect to the first lane 310 or the second lane 312 in response to the collision risk. The vehicle computer may determine that a predetermined portion of the ego vehicle 302 is in the first lane 310. For example, in some embodiments, the predetermined portion of the ego vehicle 302 is determined based on a relative position of a center line of the ego vehicle 302 with respect to a center line of the first lane 310. Based on the real-time position of the ego vehicle 302, the vehicle computer may determine that the ego vehicle 302 is in a first (e.g. initial) stage of the lane change maneuver.

At time interval T3, the vehicle computer may control the ego vehicle 302 to perform a preventive maneuver responsive to the threat vehicle 304 detected during the first stage of the lane change maneuver. In the lane change maneuver 400, the preventive maneuver includes instructions sent to actuators of the ego vehicle 302 to control the ego vehicle 302 to move back to the first lane 310. That is, the vehicle computer aborts the lane change maneuver in response to a threat detected during the first stage of the lane change maneuver. At time interval T4, the lane change maneuver is aborted and the ego vehicle 302 is controlled back to into the first lane 310.

In the scenario illustrated in FIG. 4, the trajectory 340 of the second vehicle 304 moves from the third lane 314 into the second (target) lane 312 thereby posing a collision risk to the ego vehicle 302 after the ego vehicle 302 initiates a lane change maneuver. The trajectory 320 of the ego vehicle 302 moves the ego vehicle 302 close to the lane demarcation line, and potentially slightly over the lane demarcation line, and back into the first lane 310, never substantially crossing into the second lane 312.

Figure 5:
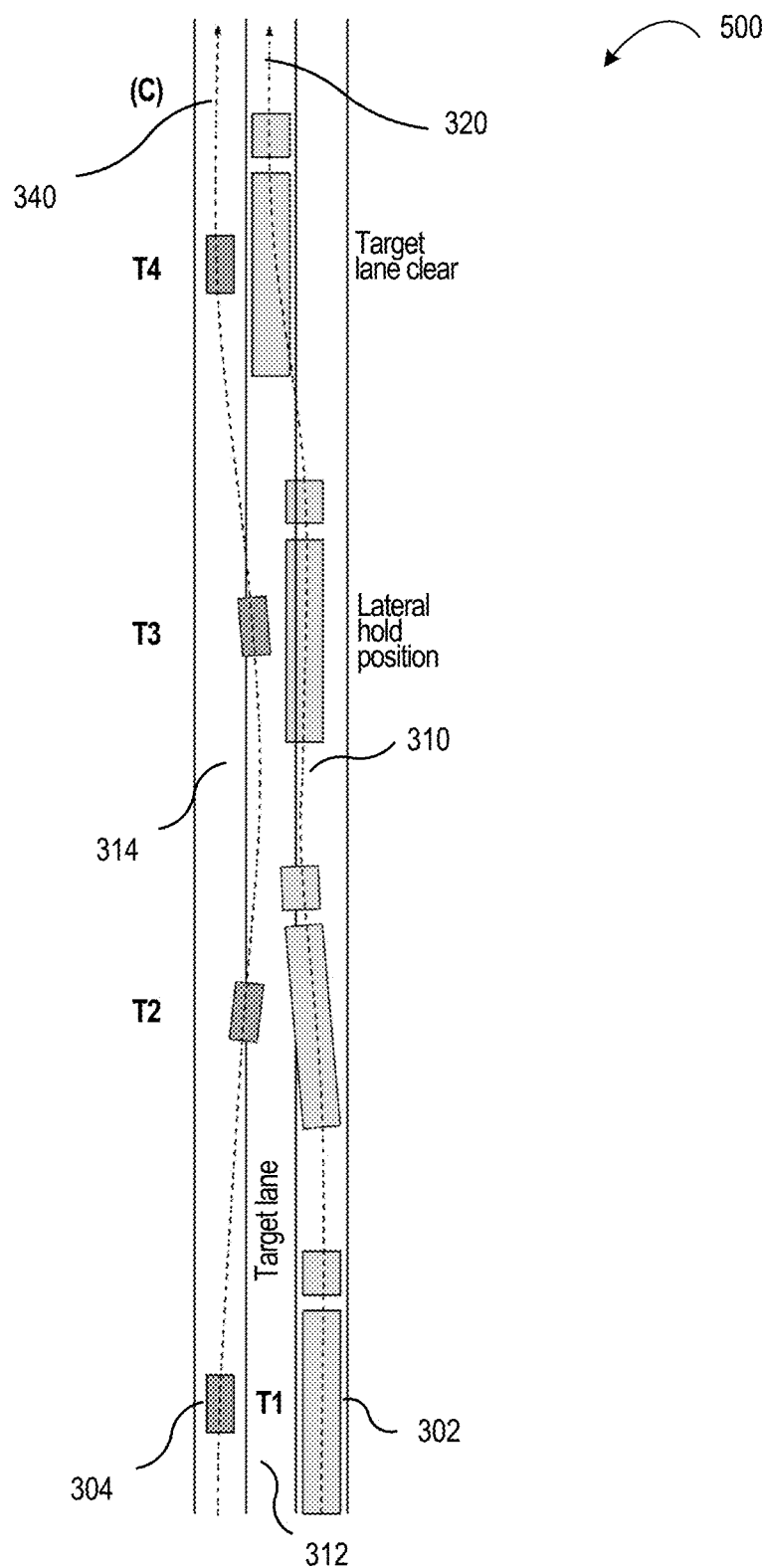
FIG. 5 illustrates a lane change maneuver that is completed by implementing a lateral position hold in response to a collision risk detected during a second stage of the maneuver, according to various embodiments.

FIG. 5 illustrates a lane change maneuver 500 that is completed by implementing a lateral position hold in response to a collision risk detected during a second stage of the maneuver, according to various embodiments. The scenario illustrated in FIG. 5 demonstrates a later stage (e.g., second stage) lateral position hold until the secondary vehicle returns to its original lane, leaving the target lane free for the ego vehicle to complete the lane change.

As illustrated in FIG. 5, at time interval T1, the ego vehicle 302 is traveling on the first lane 310 and the second vehicle (e.g. the threat vehicle) 304 is traveling on the third lane 314. The vehicle computer of the ego vehicle 302 may control the ego vehicle 302 to perform a lane change maneuver from the first lane 310 into the second lane 312 (e.g., the target lane). At time interval T2, the vehicle computer may initiate the lane change maneuver. The vehicle computer of the ego vehicle 302 may continue to monitor surrounding objects, including the second vehicle 304, while performing the lane change maneuver. The vehicle computer may determine that the second vehicle 304 initiated a lane change maneuver from the third lane 314 into the second lane 312 and that the second vehicle 304 now blocks the target lane (the second lane 312) for the ego vehicle 302. That is, the vehicle computer may detect a collision risk with a mobile object (the second vehicle 304) moving on the second lane after initiating the lane change maneuver.

After detecting the collision risk, the vehicle computer may determine how far along into the lane change maneuver has the ego vehicle 302 traveled. According to the scenario illustrated in FIG. 5, the vehicle computer may determine that the ego vehicle 302 is in the second stage of the lane change maneuver. For example, the vehicle computer may determine a real-time position of the ego vehicle 302 with respect to the first lane 310 or the second lane 312 in response to the collision risk. The vehicle computer may determine that the ego vehicle 302 is partially in the first lane 310 and partially in the second lane 312. For example, in some embodiments, the portion of the ego vehicle 302 that is in the first lane 310 and/or the second lane 312 is determined based on a relative position of a center line of the ego vehicle 302 with respect to a center line of the first lane 310. Based on the real-time position of the ego vehicle 302, the vehicle computer may determine that the ego vehicle 302 is in a second stage of the lane change maneuver.

At time interval T3, the vehicle computer may control the ego vehicle 302 to perform a preventive maneuver responsive to the threat vehicle 304 detected during the second stage of the lane change maneuver. In the lane change maneuver 500, the preventive maneuver includes instructions sent to actuators of the ego vehicle 302 to control the ego vehicle 302 to proceed along the lateral path between the first lane 310 and the second lane 312 for a predetermined amount of time. During the lateral position hold, the ego vehicle 310 has moved slightly into the second lane 312 but does not block other vehicles from moving into the second lane 312, at the same time, a larger portion of the ego vehicle 302 is in the first lane 310 such that other vehicles are blocked from moving into the first lane 310. This allows the ego vehicle 302 to reserve the option to move back into the first lane 310 should the vehicle computer determine that the lane change maneuver should be aborted.

If the vehicle computer no longer detects the second vehicle 304 (e.g. the second vehicle 304 moved back into the third lane 314 and aborted its lane change maneuver) collision risk before the predetermined amount of time has elapsed, at time interval T4 the vehicle computer controls the ego vehicle 302 to move into the second lane 312, which is now clear. At time interval T4, the lane change maneuver is completed and the ego vehicle 302 travels in the second lane 312.

In the scenario illustrated in FIG. 5, the trajectory 340 of the second vehicle 304 moves from the third lane 314 slightly into the second (target) lane 312 thereby posing a collision risk to the ego vehicle 302 after the ego vehicle 302 initiates a lane change maneuver. Shortly thereafter, the second vehicle 304 moves back to the third lane 314 clearing the second lane 312 for the ego vehicle 302. The trajectory 320 of the ego vehicle 302 moves the ego vehicle 302 over the lane demarcation line, on a lateral position hold along the demarcation line, and into the second lane 312 completing the lane change maneuver.

Figure 6:
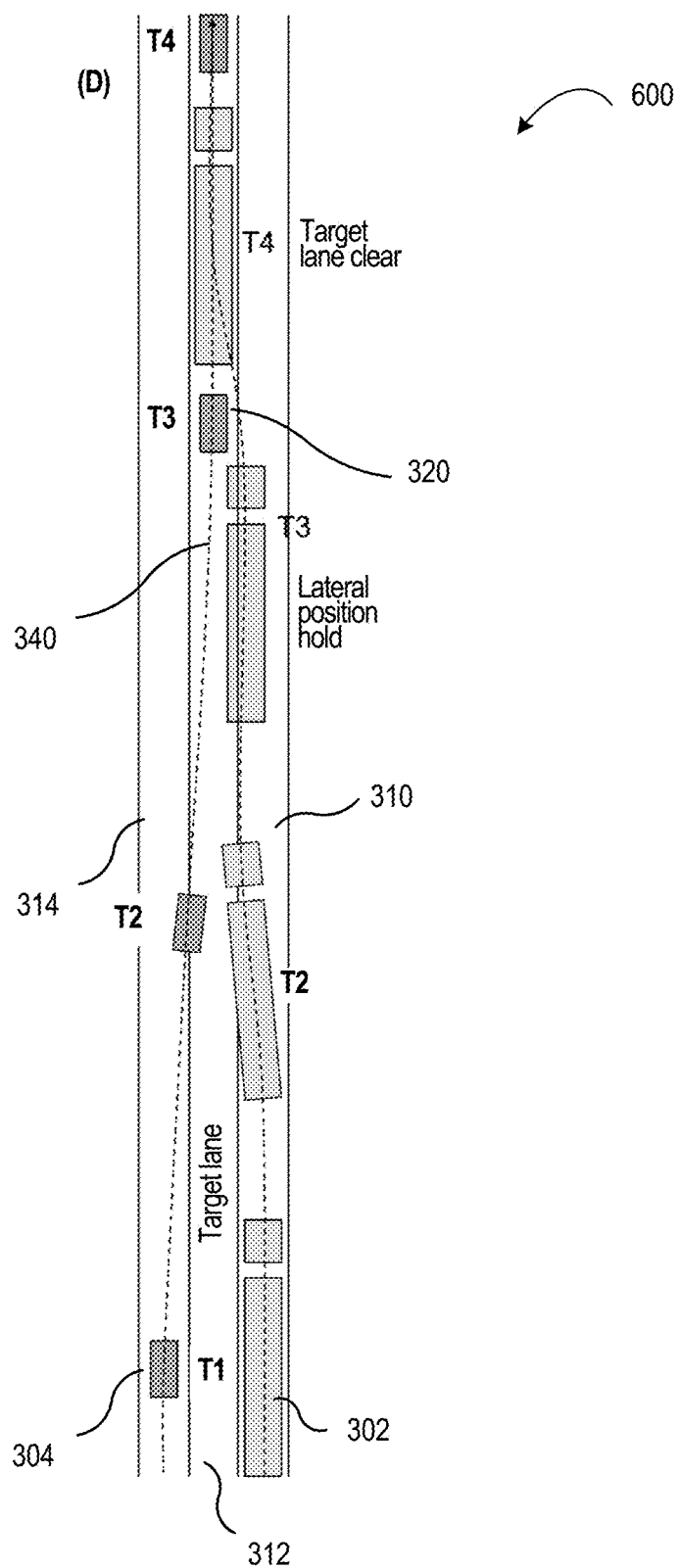
FIG. 6 illustrates a lane change maneuver that is completed by implementing a lateral position hold in response to a collision risk detected during a second stage of the maneuver, according to various embodiments.

FIG. 6 illustrates a lane change maneuver 600 that is completed by implementing a lateral position hold in response to a collision risk detected during a second stage of the maneuver, according to various embodiments. The scenario illustrated in FIG. 6 demonstrates a later stage (e.g., second stage) lateral position hold where the secondary vehicle accelerates past the ego vehicle, leaving the target lane free for the ego vehicle to complete the lane change.

As illustrated in FIG. 6, at time interval T1, the ego vehicle 302 is traveling on the first lane 310 and the second vehicle (e.g. the threat vehicle) 304 is traveling on the third lane 314. The vehicle computer of the ego vehicle 302 may control the ego vehicle 302 to perform a lane change maneuver from the first lane 310 into the second lane 312 (e.g., the target lane). At time interval T2, the vehicle computer may initiate the lane change maneuver. The vehicle computer of the ego vehicle 302 may continue to monitor surrounding objects, including the second vehicle 304, while performing the lane change maneuver. The vehicle computer may determine that the second vehicle 304 initiated a lane change maneuver from the third lane 314 into the second lane 312 and that the second vehicle 304 now blocks the target lane (the second lane 312) for the ego vehicle 302. That is, the vehicle computer may detect a collision risk with a mobile object (the second vehicle 304) moving on the second lane after initiating the lane change maneuver.

After detecting the collision risk, the vehicle computer may determine how far along into the lane change maneuver has the ego vehicle 302 traveled. According to the scenario illustrated in FIG. 6, the vehicle computer may determine that the ego vehicle 302 is in the second stage of the lane change maneuver. For example, the vehicle computer may determine a real-time position of the ego vehicle 302 with respect to the first lane 310 or the second lane 312 in response to the collision risk. The vehicle computer may determine that the ego vehicle 302 is partially in the first lane 310 and partially in the second lane 312. For example, in some embodiments, the portion of the ego vehicle 302 that is in the first lane 310 and/or the second lane 312 is determined based on a relative position of a center line of the ego vehicle 302 with respect to a center line of the first lane 310. Based on the real-time position of the ego vehicle 302, the vehicle computer may determine that the ego vehicle 302 is in a second stage of the lane change maneuver.

At time interval T3, the vehicle computer may control the ego vehicle 302 to perform a preventive maneuver responsive to the threat vehicle 304 detected during the second stage of the lane change maneuver. In the lane change maneuver 600, the preventive maneuver includes instructions sent to actuators of the ego vehicle 302 to control the ego vehicle 302 to proceed along the lateral path between the first lane 310 and the second lane 312 for a predetermined amount of time. During the lateral position hold, the ego vehicle 302 has moved slightly into the second lane 312 but does not block other vehicles from moving into the second lane 312, at the same time, a larger portion of the ego vehicle 302 is in the first lane 310 such that other vehicles are blocked from moving into the first lane 310. This allows the ego vehicle 302 to reserve the option to move back into the first lane 310 should the vehicle computer determine that the lane change maneuver should be aborted.

If the vehicle computer no longer detects the second vehicle 304 (e.g. the second vehicle 304 sped up or slowed down clearing the second lane 312 for the ego vehicle 302) or the collision risk before the predetermined amount of time has elapsed, at time interval T4 the vehicle computer controls the ego vehicle 302 to move into the second lane 312, which is now clear. At time interval T4, the lane change maneuver is completed and the ego vehicle 302 travels in the second lane 312.

In the scenario illustrated in FIG. 6, the trajectory 340 of the second vehicle 304 moves from the third lane 314 slightly into the second (target) lane 312 thereby posing a collision risk to the ego vehicle 302 after the ego vehicle 302 initiates a lane change maneuver. Shortly thereafter, the second vehicle 304 speeds up, quickly moves into the second lane 312, and moves past the ego vehicle 302 thereby clearing the second lane 312 for the ego vehicle 302. The trajectory 320 of the ego vehicle 302 moves the ego vehicle 302 over the lane demarcation line, on a lateral position hold along the demarcation line, and into the second lane 312 completing the lane change maneuver.

Figure 7:
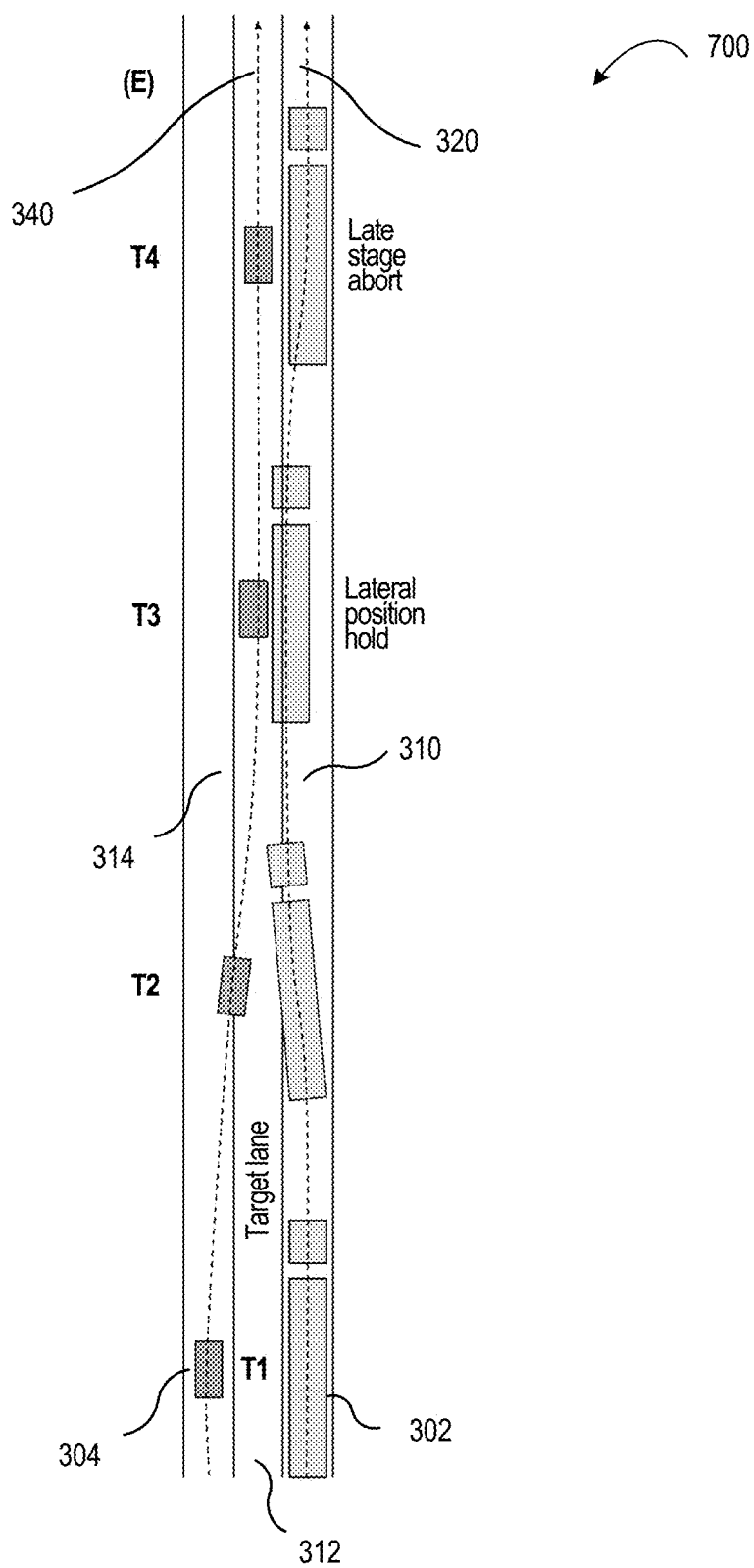
FIG. 7 illustrates a lane change maneuver 700 that is aborted after implementing a lateral position hold in response to a collision risk detected during a second stage of the maneuver, according to various embodiments.

FIG. 7 illustrates a lane change maneuver 700 that is aborted after implementing a lateral position hold in response to a collision risk detected during a second stage of the maneuver, according to various embodiments. The scenario illustrated in FIG. 7 demonstrates a later stage (e.g., second stage) lateral position hold where the secondary vehicle completes the lane change into the target lane, resulting in a late stage abort and the ego vehicle returning to its original lane.

As illustrated in FIG. 7, at time interval T1, the ego vehicle 302 is traveling on the first lane 310 and the second vehicle (e.g. the threat vehicle) 304 is traveling on the third lane 314. The vehicle computer of the ego vehicle 302 may control the ego vehicle 302 to perform a lane change maneuver from the first lane 310 into the second lane 312 (e.g., the target lane). At time interval T2, the vehicle computer may initiate the lane change maneuver. The vehicle computer of the ego vehicle 302 may continue to monitor surrounding objects, including the second vehicle 304, while performing the lane change maneuver. The vehicle computer may determine that the second vehicle 304 initiated a lane change maneuver from the third lane 314 into the second lane 312 and that the second vehicle 304 now blocks the target lane (the second lane 312) for the ego vehicle 302. That is, the vehicle computer may detect a collision risk with a mobile object (the second vehicle 304) moving on the second lane after initiating the lane change maneuver.

After detecting the collision risk, the vehicle computer may determine how far along into the lane change maneuver has the ego vehicle 302 traveled. According to the scenario illustrated in FIG. 7, the vehicle computer may determine that the ego vehicle 302 is in the second stage of the lane change maneuver. For example, the vehicle computer may determine a real-time position of the ego vehicle 302 with respect to the first lane 310 or the second lane 312 in response to the collision risk. The vehicle computer may determine that the ego vehicle 302 is partially in the first lane 310 and partially in the second lane 312. For example, in some embodiments, the portion of the ego vehicle 302 that is in the first lane 310 and/or the second lane 312 is determined based on a relative position of a center line of the ego vehicle 302 with respect to a center line of the first lane 310. Based on the real-time position of the ego vehicle 302, the vehicle computer may determine that the ego vehicle 302 is in a second stage of the lane change maneuver.

At time interval T3, the vehicle computer may control the ego vehicle 302 to perform a preventive maneuver responsive to the threat vehicle 304 detected during the second stage of the lane change maneuver. In the lane change maneuver 700, the preventive maneuver includes instructions sent to actuators of the ego vehicle 302 to control the ego vehicle 302 to proceed along the lateral path between the first lane 310 and the second lane 312 for a predetermined amount of time. During the lateral position hold, the ego vehicle 302 has moved slightly into the second lane 312 but does not block other vehicles from moving into the second lane 312, at the same time, a larger portion of the ego vehicle 302 is in the first lane 310 such that other vehicles are blocked from moving into the first lane 310. This allows the ego vehicle 302 to reserve the option to move back into the first lane 310 should the vehicle computer determine that the lane change maneuver should be aborted.

If the vehicle computer continues to detect the second vehicle 304 or the collision risk after the predetermined amount of time has lapsed (e.g., the second vehicle 304 does not move out of the second lane 312), the vehicle computer controls the ego vehicle 302 to abort the lane change maneuver and return to the first lane 310 as part of the preventive maneuver implemented by the vehicle computer. At time interval T4, the lane change maneuver is aborted and the ego vehicle 302 moves back into the first lane 310.

In the scenario illustrated in FIG. 7, the trajectory 340 of the second vehicle 304 moves from the third lane 314 slightly into the second (target) lane 312 thereby posing a collision risk to the ego vehicle 302 after the ego vehicle 302 initiates a lane change maneuver. The second vehicle 304 never clears the second lane 312 for the ego vehicle 302 to complete the lane change maneuver. The trajectory 320 of the ego vehicle 302 moves the ego vehicle 302 over the lane demarcation line, on a lateral position hold along the demarcation line, and back into the first lane 310 aborting the lane change maneuver.

Figure 8:
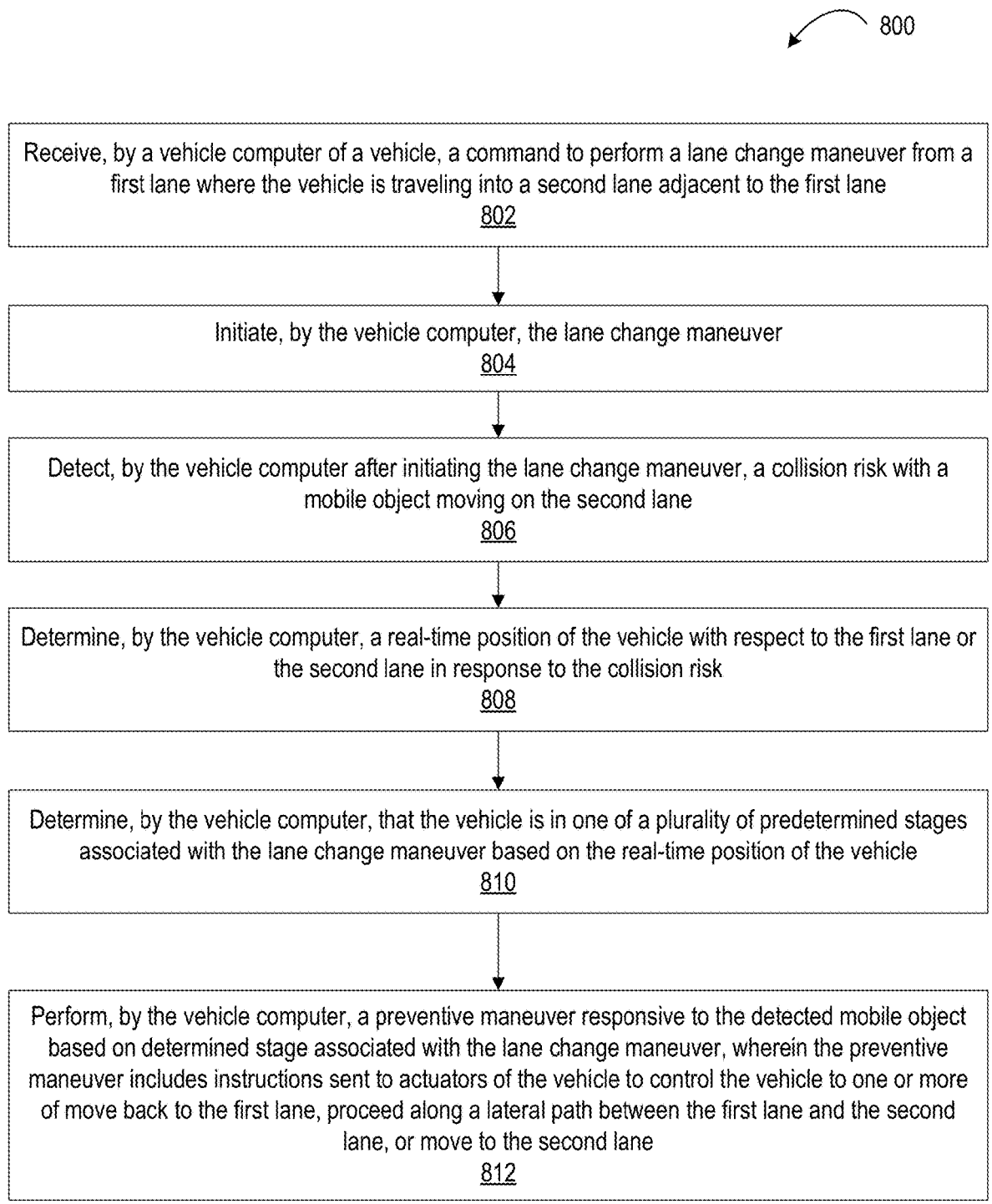
FIG. 8 is a flowchart of an example process, according to various embodiments.

FIG. 8 is a flowchart of an example process 800, according to various embodiments. In some implementations, one or more process blocks of FIG. 8 may be performed by a vehicle computer 950 of a vehicle 900 (illustrated in FIG. 9). Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As shown in FIG. 8, at block 802, process 800 may include receiving, by a vehicle computer of a vehicle, a command to perform a lane change maneuver from a first lane where the vehicle is traveling into a second lane adjacent to the first lane. In some embodiments, the vehicle may be a truck that is over 45 feet long. In some embodiments, the vehicle may be operating on an autonomous mode when the command to perform the lane change maneuver is received by the vehicle computer.

At block 804, process 800 may include initiating, by the vehicle computer, the lane change maneuver. For example, the vehicle computer may send instructions to the actuators of the vehicle to control the vehicle to move closer to a virtual or real lane demarcation line between the first lane and the second lane. While performing the lane change maneuver, the vehicle computer may continue to monitor the surroundings of the vehicle for potential new threats. For example, the vehicle computer may analyze the sensor data received from the plurality of sensors coupled to the vehicle.

At block 806, process 800 may include detecting, by the vehicle computer after initiating the lane change maneuver, a collision risk with a mobile object moving on the second lane. For example, the vehicle computer may identify among the sensor data received from the plurality of sensors coupled to the vehicle a threat vehicle that was traveling two lanes over making an attempt to move to the second (e.g., target) lane. In some embodiments, the vehicle computer may predict the behavior of the threat vehicle based on a trajectory and/or data received from the threat vehicle. The response of the vehicle computer may depend on the stage of the lane change maneuver.

At block 808, process 800 may include determining, by the vehicle computer, a real-time position of the vehicle with respect to the first lane or the second lane in response to the collision risk. For example, the real-time position of the vehicle indicates a relative position of a center line of the vehicle with respect to a center line of the first lane. In some embodiments, the vehicle computer may identify the maneuver stage based on the real-time position of the vehicle.

At block 810, process 800 may include determining, by the vehicle computer, that the vehicle is in one of a plurality of predetermined stages associated with the lane change maneuver based on the real-time position of the vehicle. As provided above, the plurality of predetermined stages associated with the lane change maneuver may include a first stage during which a predetermined portion of the vehicle is in the first lane, a second stage during which the vehicle is partially in the first lane and partially in the second lane, and a third stage during which the predetermined portion of the vehicle is in the second lane. The predetermined portion of the vehicle may be determined based on a relative position of a center line of the vehicle with respect to a center line of the first lane.

At block 812, process 800 may include performing, by the vehicle computer, a preventive maneuver responsive to the detected mobile object based on determined stage associated with the lane change maneuver, where the preventive maneuver includes instructions sent to actuators of the vehicle to control the vehicle to one or more of move back to the first lane, proceed along a lateral path between the first lane and the second lane, or move to the second lane. For example, the preventive maneuver includes instructions sent to the actuators of the vehicle to control the vehicle to move back to the first lane after proceeding along the lateral path between the first lane and the second lane, or move to the second lane after proceeding along the lateral path between the first lane and the second lane.

According to various embodiments, when the mobile object is detected during the first stage, the preventive maneuver includes instructions sent to the actuators of the vehicle to control the vehicle to abort the lane change maneuver and return to the first lane. In other embodiments, when the mobile object is detected during the second stage, the preventive maneuver includes instructions sent to the actuators of the vehicle to control the vehicle to proceed along the lateral path between the first lane and the second lane for a predetermined amount of time. If the mobile object is detected after the predetermined amount of time, the preventive maneuver further includes instructions sent to the actuators of the vehicle to control the vehicle to abort the lane change maneuver and return to the first lane. If the mobile object is not detected after the predetermined amount of time, the preventive maneuver further includes instructions sent to the actuators of the vehicle to control the vehicle to move to the second lane.

Embodiments provide various technical improvements over the current lane change maneuvers implemented by full or partial autonomous vehicles. Embodiments enable the vehicle computer to respond to a threat identified after the lane change maneuver is initiated. Specifically, embodiments enable the vehicle computer to perform a preventive maneuver to avoid a potential collision with the threat object even when the threat object is identified during late stages of the lane change maneuver. Embodiments implement a lateral position hold maneuver for a predetermined among of time during which the vehicle advances between the first lane and the second lane giving a chance to the threat vehicle to clear the second lane. Thus, instead of aborting the lane change maneuver at a late stage that would potentially cause a jerky and unstable movement for the vehicle (especially when the vehicle is a truck), embodiments implement the lateral position hold maneuver prior to moving to the second lane, or moving back to the first lane.

Figure 9:
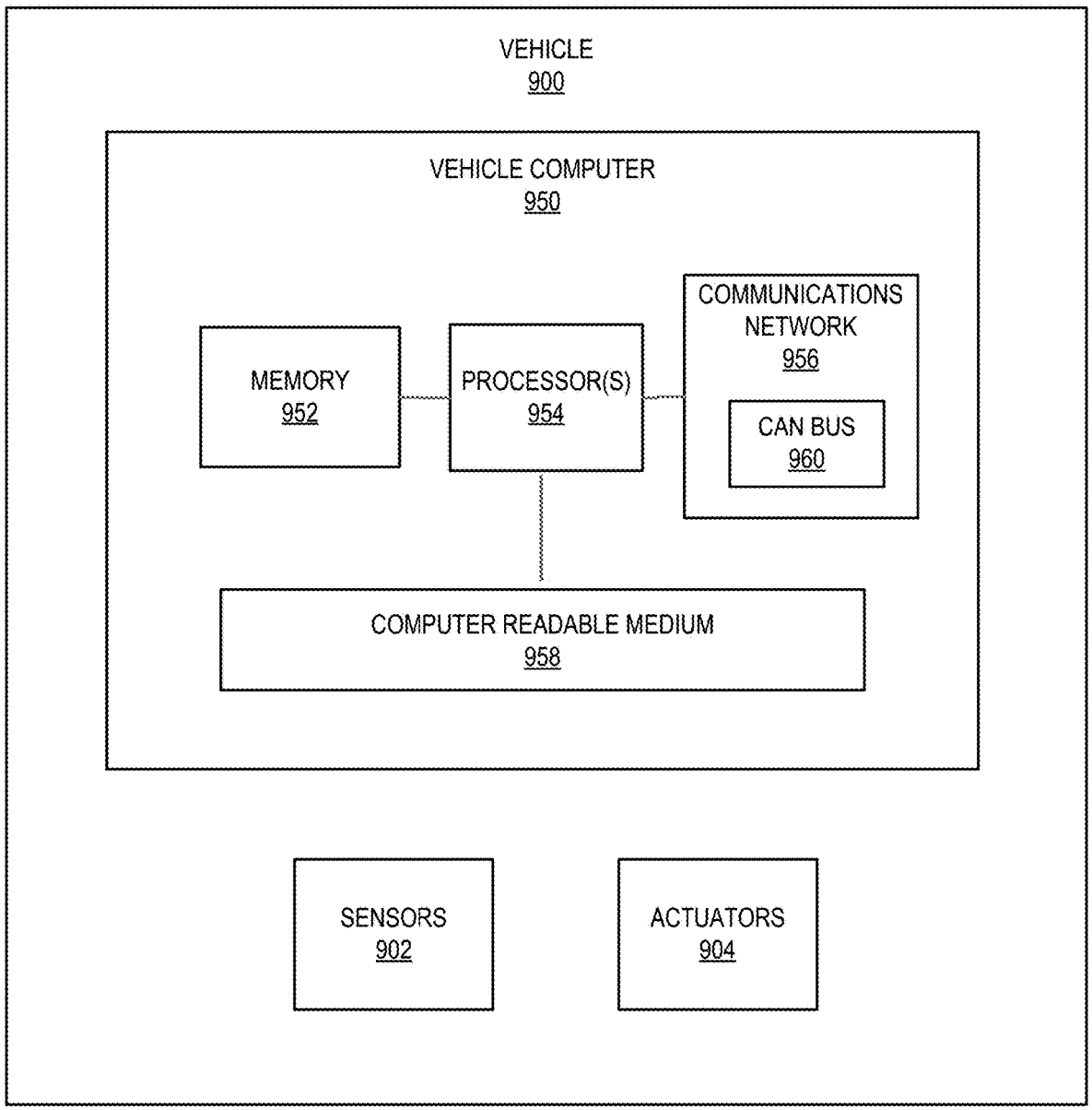
FIG. 9 illustrates a block diagram of an exemplary vehicle, according to various embodiments.

FIG. 9 illustrates a block diagram of an exemplary vehicle, according to various embodiments. The vehicle 900 may include a vehicle computer 950 that is configured to receive inputs from a plurality of sources including one or more sensors 902 coupled to the vehicle. The vehicle computer 950 is configured to generate outputs (e.g., control signals) for the one or more actuators 904 that control the vehicle 900. For example, the control signals, when executed by the actuators 904, may result in the vehicle 900 initiating a lane change maneuver. The actuators 904 may control a steering, speed or throttle of the vehicle.

According to various embodiments, the vehicle computer 950 may comprise processors 954, which may be coupled to a system memory 952 and a communications network 956.

The memory 952 may be in the form of one or more memory devices (e.g., RAM, EEPROM, ROM chips), using any suitable mode of data storage. The memory 952 may store one or more software algorithm(s) (not shown). The software algorithm(s) may include, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s).

The communications network 956 can be any suitable communications network(s) for transferring data among, to and from the components of the vehicle computer 950. In some instances, the communication network(s) may include one or more of a wired network such as, an Ethernet backbone network, a controller area network (CAN) bus 960, a local interconnect network (LIN), a media-oriented system transport (MOST), a fiber-optic network, a digital subscription line ("DSL") network, a broadband network, and/or a flexray network. In other instances, the communication network(s) may also include a wireless network such as, for example, a Wi-Fi or wireless local area network ("WLAN"), a wireless wide area network ("WWAN"), and/or a cellular network.

The sensor 902 may include one or more of a thermal imager camera, an infrared camera, a stereo camera, a time of flight camera, an red/green/blue (RGB) camera, a 2-D camera, a 3-D camera, a 360-degree camera, an imaging radar, a 3-D radar, a 4-D radar, a short-range radar, a medium-range radar, a long-range radar, a pulse-Doppler radar, a frequency-modulated continuous-wave (FMCW) radar, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, an active sonar, a passive sonar, etc. One of ordinary skill in the art will appreciate that sensors 902 may include other types of sensors and the examples above are not meant to be exhaustive.

A computer readable medium 958 may also be operatively coupled to the processors 954 of the vehicle computer 950. The computer readable medium 958 may comprise code, executable by the processors 954, to perform a method including receiving a command to perform a lane change maneuver from a first lane where the vehicle is traveling into a second lane adjacent to the first lane; initiating the lane change maneuver; detecting, after initiating the lane change maneuver, a collision risk with a mobile object moving on the second lane; determining a real-time position of the vehicle with respect to the first lane or the second lane in response to the collision risk; determining that the vehicle is in one of a plurality of predetermined stages associated with the lane change maneuver based on the real-time position of the vehicle; performing a preventive maneuver responsive to the detected mobile object based on determined stage associated with the lane change maneuver, where the preventive maneuver includes instructions sent to actuators of the vehicle to control the vehicle to one or more of move back to the first lane, proceed along a lateral path between the first lane and the second lane, or move to the second lane.

Although vehicle 900 (see FIG. 9) is described and illustrated as one particular configuration of vehicle, embodiments of the disclosure are suitable for use with a multiplicity of vehicles. In some instances, embodiments of the disclosure are particularly well suited for use with long haul or short haul vehicles, including but not limited to trucks, that carry a variety of cargo.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

With reference to the appended figures, components that can include memory (e.g., memory 952) can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer, controller, or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

What is claimed is:

1. A method comprising:
receiving, by a vehicle computer of a vehicle, a command to perform a lane change maneuver from a first lane where the vehicle is traveling into a second lane adjacent to the first lane;
initiating, by the vehicle computer, the lane change maneuver;
detecting, by the vehicle computer after initiating the lane change maneuver, a collision risk with a mobile object while the vehicle is partially in the first lane and partially in the second lane; and
performing, by the vehicle computer, a preventive maneuver responsive to the detected mobile object,
wherein the preventive maneuver includes instructions sent to actuators of the vehicle to control the vehicle to proceed along a lateral path between the first lane and the second lane for a predetermined amount of time prior to returning to the first lane or moving into the second lane.

2. The method of claim 1, wherein, after the predetermined amount of time is expired, the preventive maneuver includes instructions sent to the actuators of the vehicle to control the vehicle to:
move back into the first lane and abort the lane change maneuver if the collision risk persists; or
move to the second lane if the collision risk is no longer present.

3. The method of claim 1, wherein the lateral path between the first lane and the second lane includes a real or virtual lane demarcation line.

4. The method of claim 1, wherein the command to perform a lane change maneuver is received from a driver of the vehicle.

5. The method of claim 1, wherein the command to perform a lane change maneuver is generated by a control module of the vehicle computer.

6. The method of claim 1, wherein the vehicle is operating on an autonomous mode when the command to perform the lane change maneuver is received by the vehicle computer.

7. The method of claim 1, further comprising:
determining a relative position of a center line of the vehicle with respect to a center line of the first lane; and
determining that the vehicle is partially in the first lane and partially in the second lane based on the relative position of the center line of the vehicle with respect to the center line of the first lane.

8. The method of claim 7, further comprising:
determining that the center line of the vehicle moved past the center line of the first lane by a predetermined amount of distance.

9. The method of claim 1, wherein the vehicle is over 45 feet long.

10. The method of claim 1, wherein performing the preventive maneuver further comprises adjusting a heading of the vehicle to assume a lateral position hold maneuver along the lateral path.

11. The method of claim 1, further comprising:
determining, by the vehicle computer, that the collision risk persists after the predetermined amount of time is expired; and
outputting, by the vehicle computer, an alert asking a driver of the vehicle to assume control of the vehicle.

12. A vehicle computer of a vehicle, the vehicle computer comprising:
one or more processors; and
a memory storing instructions that, when executed by the one or more processors, cause the one or more processors to:
receive a command to perform a lane change maneuver from a first lane where the vehicle is traveling into a second lane adjacent to the first lane;
initiate the lane change maneuver;
detect, after initiating the lane change maneuver, a collision risk with a mobile object while the vehicle is partially in the first lane and partially in the second lane; and
perform a preventive maneuver responsive to the detected mobile object,
wherein the preventive maneuver includes instructions sent to actuators of the vehicle to control the vehicle to proceed along a lateral path between the first lane and the second lane for a predetermined amount of time prior to returning to the first lane or moving into the second lane.

13. The vehicle computer of claim 12, wherein, after the predetermined amount of time is expired, the preventive maneuver includes instructions sent to the actuators of the vehicle to control the vehicle to:
move back into the first lane and abort the lane change maneuver if the collision risk persists; or
move to the second lane if the collision risk is no longer present.

14. The vehicle computer of claim 12, wherein the command to perform a lane change maneuver is:
received from a driver of the vehicle, or
generated by a control module of the vehicle computer.

15. The vehicle computer of claim 12, wherein the vehicle is operating on an autonomous mode when the command to perform the lane change maneuver is received by the vehicle computer.

16. The vehicle computer of claim 12, wherein the instructions, when executed by the one or more processors, further cause the one or more processors to:
determine a relative position of a center line of the vehicle with respect to a center line of the first lane;
determine that the center line of the vehicle moved past the center line of the first lane by a predetermined amount of distance; and
determine that the vehicle is partially in the first lane and partially in the second lane based on the relative position of the center line of the vehicle with respect to the center line of the first lane.

17. The vehicle computer of claim 12, wherein the vehicle is over 45 feet long.

18. The vehicle computer of claim 12, wherein performing the preventive maneuver further comprises adjusting a heading of the vehicle to assume a lateral position hold maneuver along the lateral path.

19. The vehicle computer of claim 12, wherein the instructions, when executed by the one or more processors, further cause the one or more processors to:
determine that the collision risk persists after the predetermined amount of time is expired; and output an alert asking a driver of the vehicle to assume control of the vehicle.

20. A non-transitory computer-readable medium storing instructions that, when executed by one or more processors of a vehicle computer of a vehicle, cause the vehicle computer to:
- receive a command to perform a lane change maneuver from a first lane where the vehicle is traveling into a second lane adjacent to the first lane;
- initiate the lane change maneuver;
- detect, after initiating the lane change maneuver, a collision risk with a mobile object while the vehicle is partially in the first lane and partially in the second lane; and
- perform a preventive maneuver responsive to the detected mobile object,
- wherein the preventive maneuver includes instructions sent to actuators of the vehicle to control the vehicle to proceed along a lateral path between the first lane and the second lane for a predetermined amount of time prior to returning to the first lane or moving into the second lane.

* * * * *